April 22, 1958   C. F. LOCKHART   2,831,645
SUPPORT FOR AUTOMATIC TRAIN PIPE CONNECTOR
Filed Aug. 10, 1953
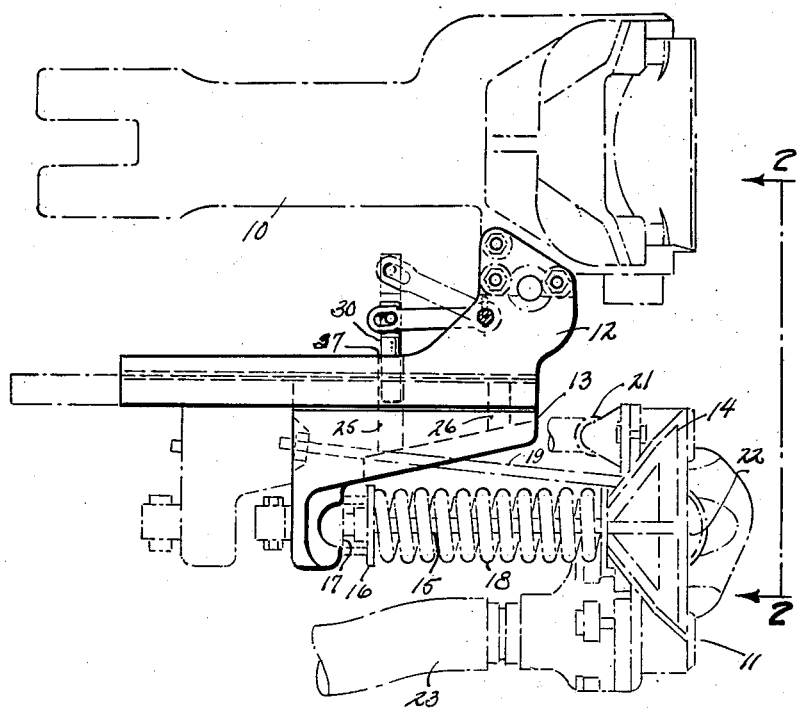
Fig.1
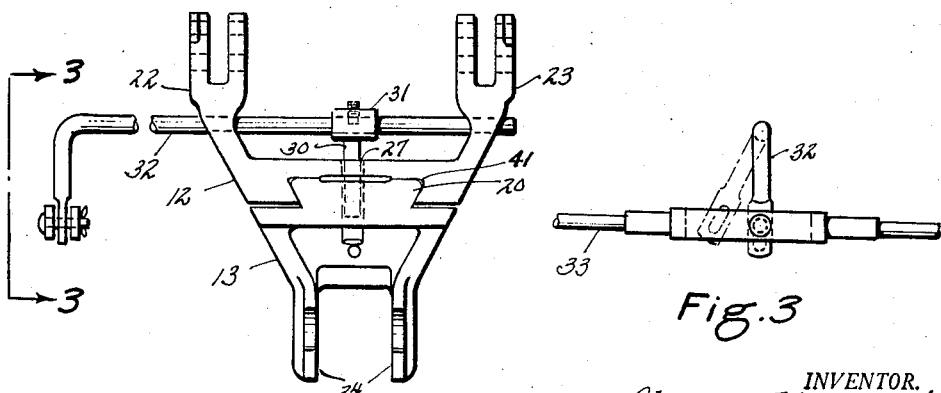
Fig.2
Fig.3
INVENTOR.
Charles F. Lockhart
BY Bates, Teare & McBean
Attorneys

United States Patent Office 2,831,645
Patented Apr. 22, 1958

2,831,645
SUPPORT FOR AUTOMATIC TRAIN PIPE CONNECTOR

Charles F. Lockhart, Cleveland, Ohio

Application August 10, 1953, Serial No. 373,180

3 Claims. (Cl. 248—53)

This invention relates to train pipe connectors for connecting fluid pressure conduits of adjacent cars and more particularly relates to a device for adjustably supporting a connector for movement into operative or inoperative connecting position.

The coupling mechanism for connecting adjacent cars of a train usually includes a mechanism for connecting the air signal, brake and steam conduits of the adjacent cars. Preferably the connections are automatically made when the cars are coupled or uncoupled. An automatic train pipe connector of this type is illustrated, described and claimed in United States Patent No. 2,296,170 which issued to me on September 15, 1942. Such a connector is adapted for connection with a similar connector on an adjacent car. However, where the car equipped with an automatic train pipe connector is to be connected with one not so equipped, it is desirable to position the automatic connector out of the way to permit another connection to be made. Accordingly, a principal object of this invention is to movably support the automatic connector head for selective positioning into and out of operative connecting position relative to the pipe connections on the adjacent car.

Briefly, in accordance with this invention, the automatic connector head is mounted on a carriage which may be slidably positioned into and out of connecting position on a fixed supporting bracket carried by the car and releasably locked in either position.

In the drawings,

Fig. 1 is an assembly view of the movable connector head support.

Fig. 2 is a view taken along the lines 2—2 in Fig. 1; and

Fig. 3 is a view of the locking lever taken along the lines 3—3 in Fig. 2.

For convenience of illustration, the supporting bracket and connector carriage are shown in relation to the coupling draw bar of a train car and the connector. In Fig. 1 of the drawings, the coupling draw bar 10 and the connector 11 are shown in dotted lines assembled in relation to a supporting bracket 12 and carriage 13. The draw bar 10 is conventional and is adapted to be coupled to a similar draw bar on an adjacent car in the conventional manner. The train pipe connector is shown as having a head indicated in general at 14 and a shank 15 which extends through a member 16 for connection with a member 17 that is carried by the carriage arms 24 in a manner to permit universality of movement of the connector head with respect to the carriage. A spring 18 interposed between the member 17 and the head 14 operates to urge the head forwardly while a bar 19, having one end attached to the head and the other end slidably mounted in the carriage holds the head 14 in proper vertical position to effect the automatic coupling.

The connector head 14 has provision for attachment to an air signal conduit 21, to an air brake conduit 22 and to a steam conduit 23 respectively. The signal and steam conduits 21 and 23 emerge from the head at substantially right angles to the plane of the meeting face of the head, whereas the air brake conduit 22 emerges from the head at an angle of about 45° with respect to the plane of the meeting face of the head.

In accordance with the invention the carriage 13 carries the head 14 together with its associated springs and pipe connections and, as best shown in Fig. 2, is provided with a longitudinally disposed guide in the form of an inverted wedge 20 adapted to slidably engage a mating guideway 41 in the supporting bracket 12. The bracket 12 is a wishbone-type bracket having spaced supporting arms 22 and 23 extending upwardly for engagement with depending mounts on the coupler draw bar to which the bracket 12 is fixedly secured by means of connecting bolts. Thus, the carriage 13 with its associated connector head 14 can be slidably positioned along the supporting bracket 12 towards and away from the pipe connections on an adjacent coupled car.

In order that the carriage 13 and connector head 14 may be locked in either operative or inoperative connecting position, the carriage 13 is provided with trunnion recesses 25 and 26 spaced from each other along the guide for successive alignment with a similar recess 27 intersecting the bracket guideway 41. A locking pin 30 is coupled through a lost motion connection to one end of a lever 31 which is in turn connected at its other end to a bell crank lever 32 extending through the supporting arms of the bracket. As shown in Figs. 2 and 3, the lever 32 is free to rotate in the bracket supporting arms and can be pivoted at its crank end by means of a lost-motion connection to a push rod 33 to position the pin 30 through the bracket recess 27 and into an aligned one of the trunnion recesses in the carriage 13. Thus, the carriage 13 and associated connector head 14 can be locked in a forward connecting position or in a rearward inoperative position by means of the pin 30. In this manner, when the car carrying the connector head 14 is coupled to a car not so equipped, the connector head 14 may be positioned rearward out of the way leaving adequate clearance to permit some other type connection of the pipes and conduits between adjacent cars.

I have shown and described what I consider to be the preferred embodiment of my invention, along with suggested modifications, and it will be obvious to those skilled in the art that other changes and modifications may be made without departing from the scope of my invention as defined by the appended claims.

I claim:

1. A device for movably supporting a train pipe connector on a car for positioning relative to pipe connections on another car comprising, a bracket having a body portion with an open-ended wedge-shaped guideway extending longitudinally in the connecting direction along the lower surface thereof, said bracket having a pair of spaced supporting arms extending upwardly from the body portion on either side of said guideway and adapted to be connected to a car coupler, said body portion having an opening extending vertically therethrough and intersecting the guideway, a carriage having means for supporting a train pipe connector head so that it projects beyond one end of the carriage in the connecting direction, said carriage having a body portion with a longitudinally disposed wedge-shaped mating guide formed on its upper surface and adapted to slidably engage the bracket guideway, said carriage guide having a plurality of vertical apertures spaced in longitudinal alignment along its upper surface and adapted for selective alignment with the opening through the bracket guideway, a bell crank having one arm pivotally extending through the bracket supporting arms and carrying a lever arm thereon, said lever arm having a free end extending in the direction of the guideway and surmounting the opening through the guideway, and a locking pin having one end coupled through a lost motion connection to the free extended end of said lever arm and having its other end extending freely into the guideway opening, whereby said locking pin may be positioned through said opening into an aligned carriage guide aperture by rotation of the bell crank lever to lock the carriage in fixed position relative to the bracket.

2. The device of claim 1 wherein the other arm of said bell crank is coupled through a lost motion connection to an operating member.

3. The device of claim 1 wherein the body portion of said carriage has a beveled lower surface increasing its vertical cross section in a longitudinal direction extending from the connector head end thereof and terminating at the other end in a pair of transversely spaced depending arms, and wherein said connector head supporting means is coupled between said depending arms.

References Cited in the file of this patent

UNITED STATES PATENTS

| | | |
|---|---|---|
| 234,477 | Hotchkiss | Nov. 16, 1880 |
| 1,931,208 | Robinson | Oct. 17, 1933 |
| 2,624,252 | Judd | Jan. 6, 1953 |